US012413939B2

(12) United States Patent
Shi et al.

(10) Patent No.: US 12,413,939 B2
(45) Date of Patent: Sep. 9, 2025

(54) MULTICAST-BROADCAST SERVICES SUPPORT FOR NETWORK RELAY

(71) Applicant: INTERDIGITAL PATENT HOLDINGS, INC., Wilmington, DE (US)

(72) Inventors: Xiaoyan Shi, Lake Oswego, OR (US); Behrouz Aghili, Commack, NY (US); Guanzhou Wang, Brossard (CA); Michelle Perras, Montreal (CA); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 300 days.

(21) Appl. No.: 18/020,866

(22) PCT Filed: Aug. 12, 2021

(86) PCT No.: PCT/US2021/045697
§ 371 (c)(1),
(2) Date: Feb. 10, 2023

(87) PCT Pub. No.: WO2022/036064
PCT Pub. Date: Feb. 17, 2022

(65) Prior Publication Data
US 2023/0308840 A1 Sep. 28, 2023

Related U.S. Application Data

(60) Provisional application No. 63/064,630, filed on Aug. 12, 2020.

(51) Int. Cl.
*H04W 4/06* (2009.01)
*H04W 4/08* (2009.01)
(Continued)

(52) U.S. Cl.
CPC ............. *H04W 4/08* (2013.01); *H04W 12/06* (2013.01); *H04W 12/63* (2021.01)

(58) Field of Classification Search
CPC ... H04L 12/18; H04L 12/1845; H04L 12/185; H04L 12/1863; H04L 12/189;
(Continued)

(56) References Cited

U.S. PATENT DOCUMENTS 11,924,184 B2 * 3/2024 Guo ..................... H04L 63/061
2016/0344566 A1 * 11/2016 Pudney ................ H04L 12/189
(Continued)

FOREIGN PATENT DOCUMENTS

EP 3 095 212 A1 11/2016
WO 2018/129543 A1 7/2018

OTHER PUBLICATIONS

Technical Report, 3GPP TR 23.752 V0.4.0, 3rd Generation Partnership Project; Technical Specification Group Services and System Aspects; Study on system enhancement for Proximity based Services (ProSe) in the 5G System (5GS), 121 pages, Jun. 2020.*
(Continued)

*Primary Examiner* — Frank Duong
(74) *Attorney, Agent, or Firm* — Condo Roccia Koptiw LLP

(57) ABSTRACT

Systems, methods, and instrumentalities associated with providing and/or receiving a multicast-broadcast service (MBS) in a wireless communication system are described herein. A network relay may be used to facilitate the provision of the MBS to a remote wireless transmit/receive unit (WTRU). The network relay may request network authorization to join the MBS on behalf of the remote WTRU. The network relay may include an identifier of the remote WTRU and information regarding the multicast group that the remote WTRU desires to join in the autho- (Continued)

rization request. The network relay may inform the remote WTRU about an authorization response received from the network, and may forward MBS traffic to the remote WTRU if authorization is granted. The network relay may broadcast an MBS relay support indication to one or more remote WTRUs. The network relay may receive a group paging monitor request from a remote WTRU and may monitor group paging messages for the remote WTRU in response.

20 Claims, 13 Drawing Sheets

(51) Int. Cl.
  *H04W 12/06* (2021.01)
  *H04W 12/63* (2021.01)
(58) Field of Classification Search
  CPC ..... H04L 47/806; H04L 49/20; H04L 49/201; H04L 61/5069; H04L 2012/5642; H04W 4/02; H04W 4/06; H04W 4/08; H04W 12/06; H04W 12/63; H04W 76/40
  See application file for complete search history.

(56) References Cited

U.S. PATENT DOCUMENTS

| | | | |
|---|---|---|---|
| 2019/0349951 A1* | 11/2019 | Ahmad | H04W 76/18 |
| 2022/0007445 A1* | 1/2022 | Pan | H04W 76/15 |
| 2023/0164854 A1* | 5/2023 | Gan | H04W 68/00 370/329 |
| 2023/0180098 A1* | 6/2023 | Harounabadi | H04W 40/24 370/315 |
| 2023/0180317 A1* | 6/2023 | Harounabadi | H04W 72/20 370/329 |
| 2023/0209573 A1* | 6/2023 | Baek | H04W 72/30 370/312 |
| 2024/0188014 A1* | 6/2024 | Mladin | H04W 4/70 |

OTHER PUBLICATIONS

Qualcomm Incorporated, UE-to-network relay architecture and procedures, 3GPP TSG RAN WG2 Meeting #111-e E-Conference, R2-2006555, 6 pages, Aug. 17-28, 2020.*

3rd Generation Partnership Project, 3GPP TR 23.752 V0.4.0, "Technical Specification Group Services and System Aspects, Study on System Enhancement for Proximity based Services (ProSe) in the 5G System (5GS) (Release 17)", Jun. 2020, 121 pages.

3rd Generation Partnership Project, 3GPP TR 23.757 V0.4.0, "Technical Specification Group Services and System Aspects, Study on Architectural Enhancements for 5G Multicast-Broadcast services (Release 17)", Jun. 2020, 156 pages.

3rd Generation Partnership Project, 3GPP TS 23.501 V16.0.0, "Technical Specification Group Services and System Aspects, System Architecture for the 5G System, Stage 2 (Release 16)", Mar. 2019, 318 pages.

3rd Generation Partnership Project, 3GPP TS 23.502 V16.0.0, "Technical Specification Group Services and System Aspects, Procedures for the 5G System, Stage 2 (Release 16)", Mar. 2019, 420 pages.

* cited by examiner

MULTICAST-BROADCAST SERVICES SUPPORT FOR NETWORK RELAY

CROSS-REFERENCE TO RELATED APPLICATIONS

This application is the National Stage Entry under 35 U.S.C. § 371 of Patent Cooperation Treaty Application No. PCT/US2021/045697, filed Aug. 12, 2021, which claims the benefit of Provisional U.S. Patent Application No. 63/064,630, filed Aug. 12, 2020, the disclosure of which is incorporated herein by reference in its entirety.

BACKGROUND

Mobile communication technologies continue to evolve. A fifth generation of mobile communication radio access technology (RAT) may be referred to as 5G or New Radio (NR). A multicast-broadcast service (MBS) may be provided in a mobile communication system employing the 5G/NR technologies. The MBS may include a point-to-multipoint service in which data may be transmitted from a source entity (e.g., a network node) to multiple target entities such as, for example, multiple wireless transmit/receive units (WTRUs). Some of these WTRUs, however, may not have direct access to the network node that provides the multicast-broadcast services. Accordingly, systems, methods, and instrumentalities may be desirable for enabling and/or facilitating multicast-broadcast services in a 5G/NR communication system.

SUMMARY

Systems, methods, and instrumentalities associated with providing multicast-broadcast service (MBS) support for a wireless transmit receive unit (WTRU) are described herein. A first wireless transmit/receive unit (WTRU) may be configured to operate as a network relay for a second WTRU. The first WTRU may comprise a processor that is configured to receive a first message from the second WTRU (e.g., via a PC5 interface) indicating that the second WTRU desires to join a multicast group associated with a network. In response, the first WTRU may send an MBS authorization request to the network (e.g., to a session management function (SMF) or access and mobility management function (AMF) of the network) on behalf of the second WTRU. The authorization request may indicate at least the multicast group that the second WTRU desires to join and an identity of the second WTRU. The first WTRU may receive a response from the network indicating whether the authorization request has been accepted or rejected, and may send a second message to the second WTRU indicating if the second WTRU is allowed to join the multicast group.

In examples, the first message received by the first WTRU from the second WTRU may include an identifier of the multicast group that the second WTRU desires to join. In examples, the authorization request sent by the first WTRU may include at least one of an internet protocol (IP) address associated with the multicast group or a temporary mobile group identity associated with the multicast group. In examples, the first WTRU may be further configured to include an identifier of the first WTRU in the identifier in the authorization request. In examples, subsequent to receiving a response from the network indicating that the authorization request has been accepted, the first WTRU may receive multicast information (e.g., IP data) from the network and forward the multicast information to the second WTRU (e.g., based on an identity of the second WTRU). In examples, the first WTRU may create or modify a quality of service (QoS) flow associated with the PC5 interface (e.g., between the first and second WTRUs) based on the multicast information (e.g., QoS associated with the multicast information) received from the network.

EXAMPLE NETWORKS FOR IMPLEMENTATION OF THE EMBODIMENTS

Figure 1A:
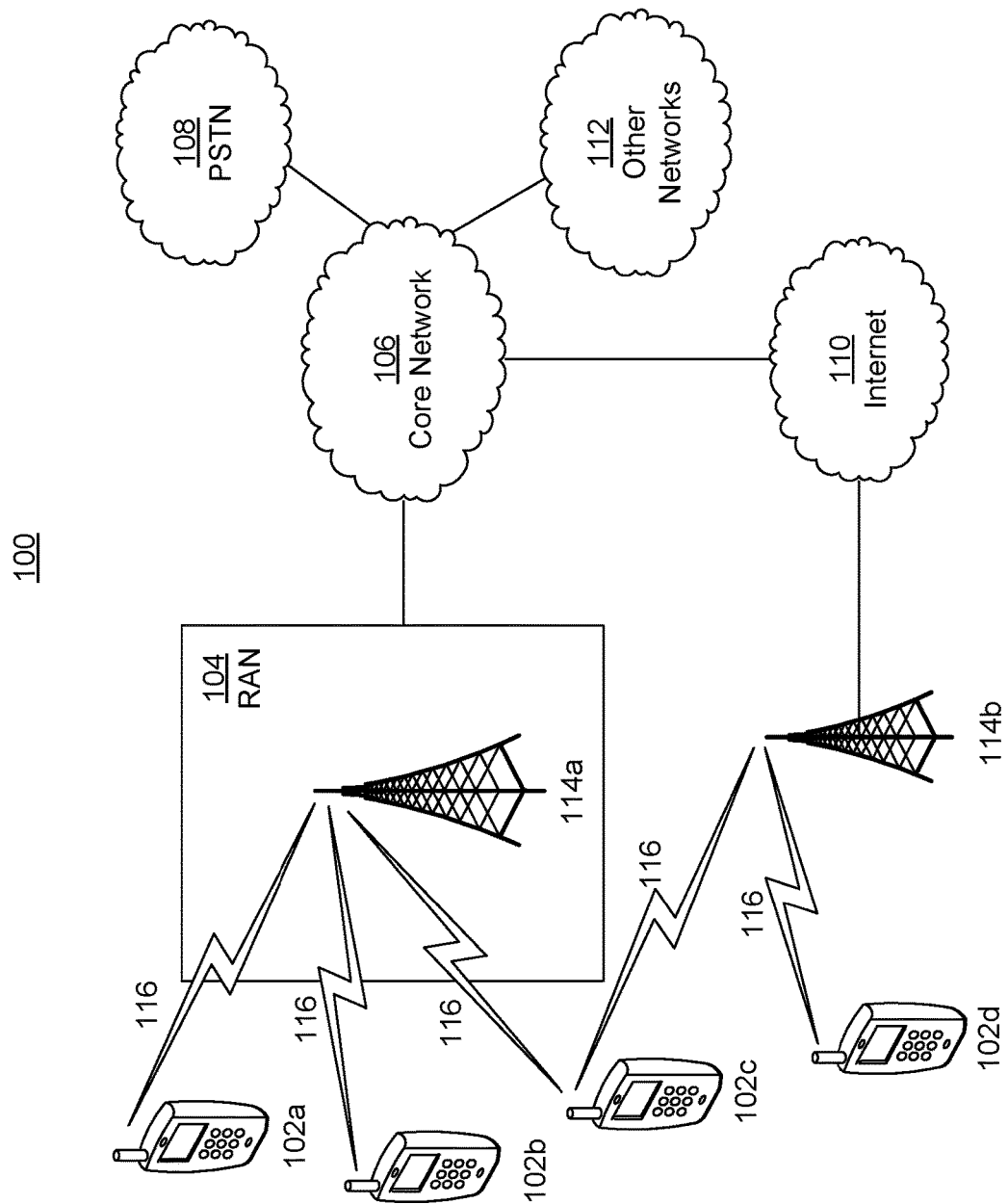
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
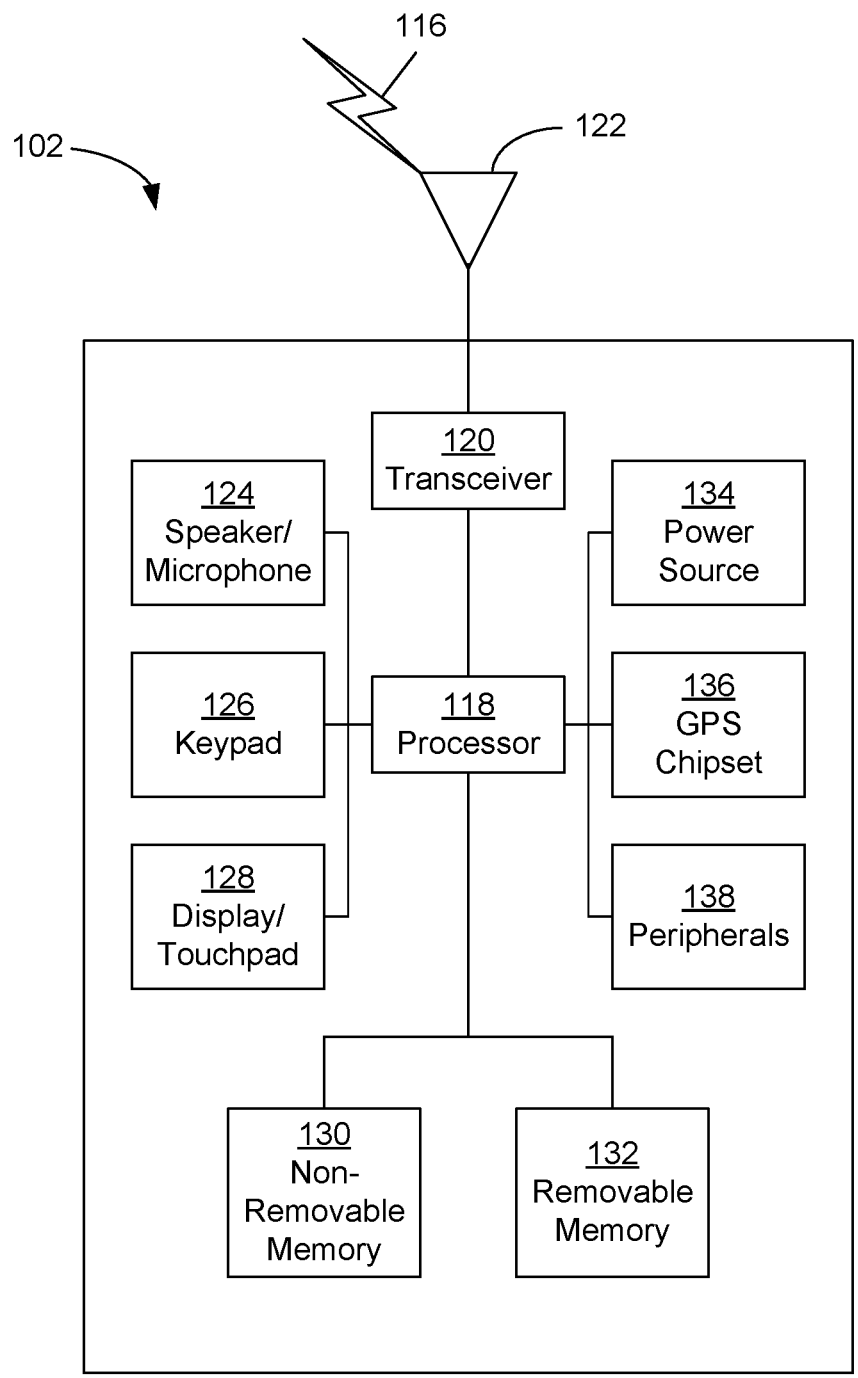
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
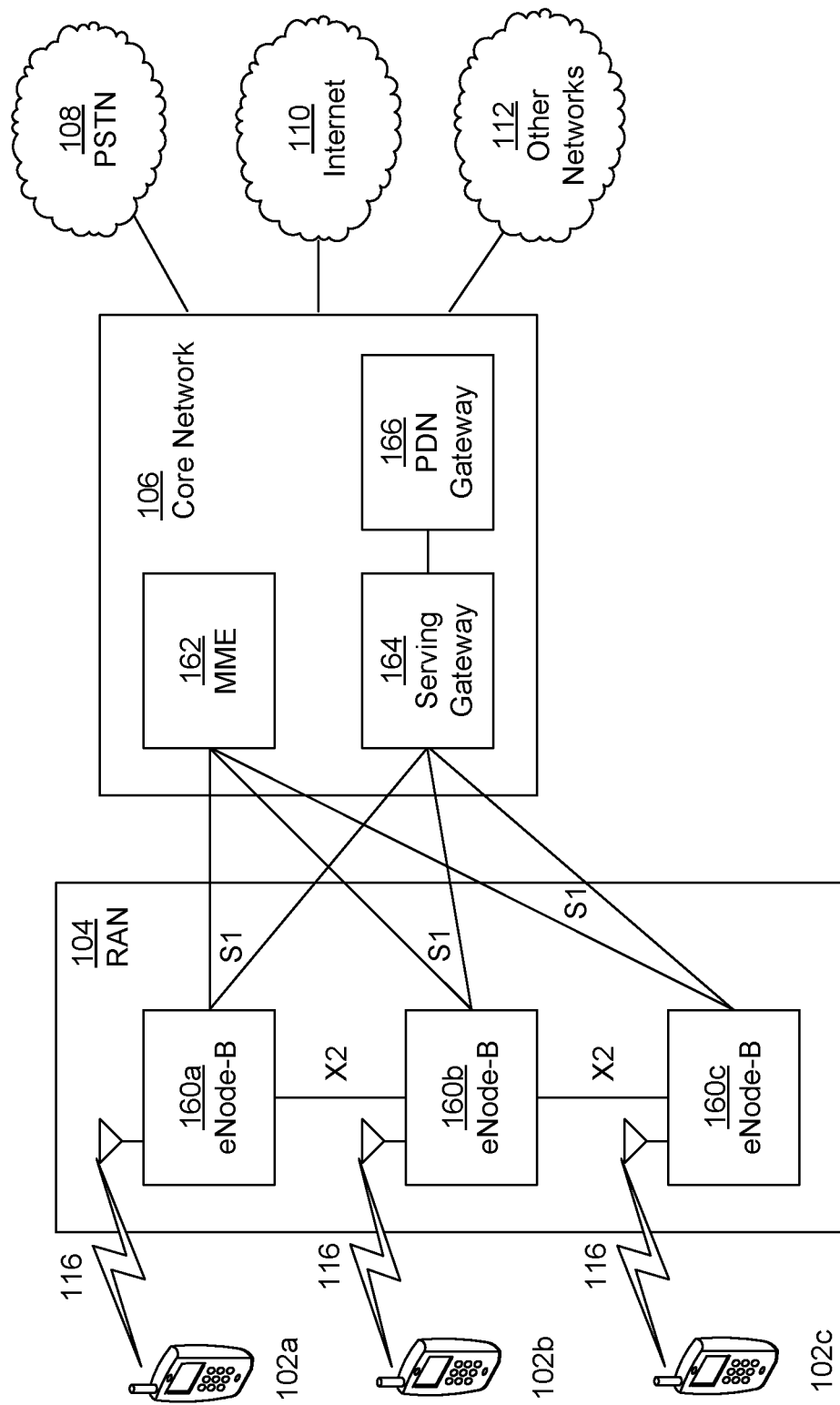
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
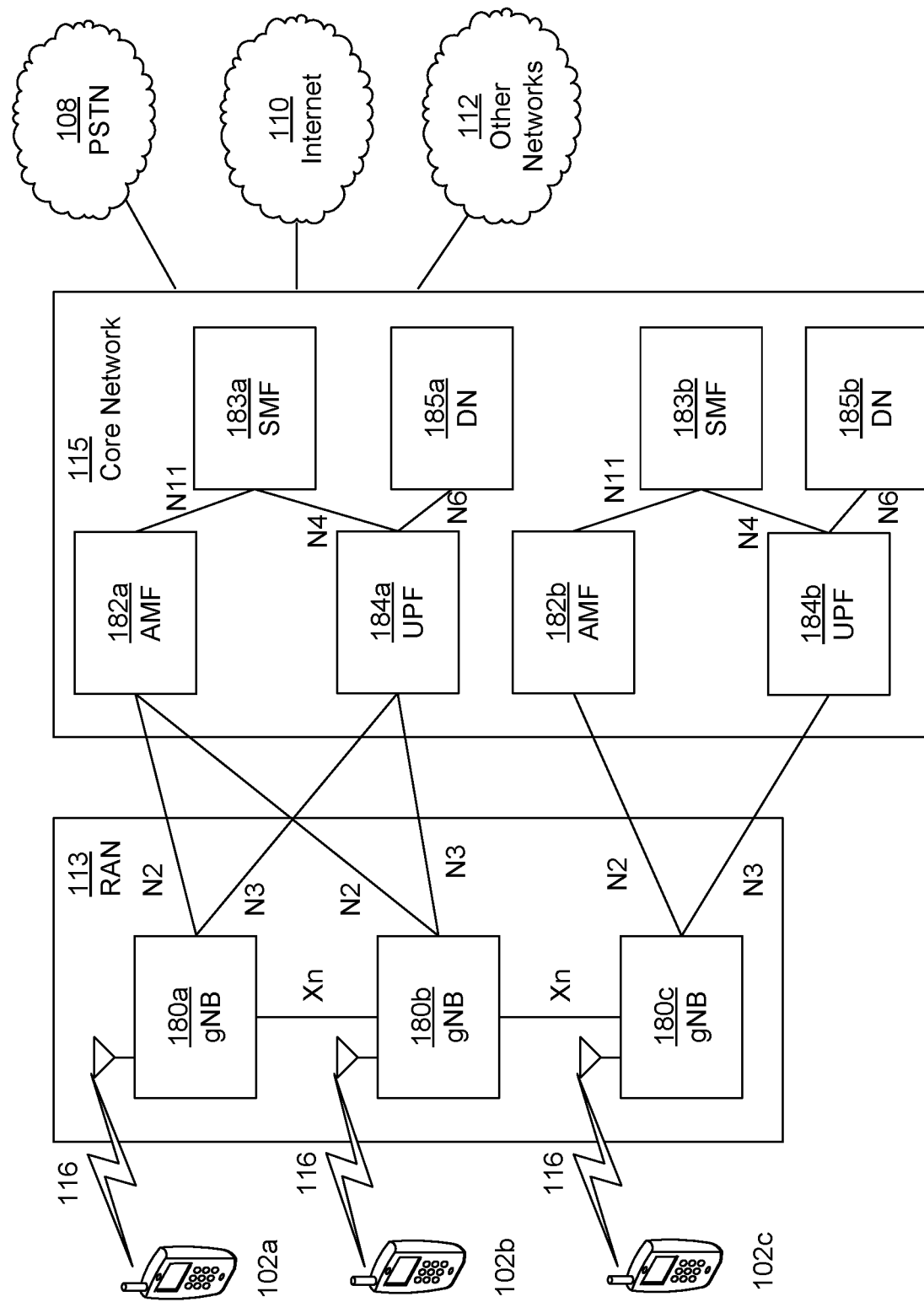
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
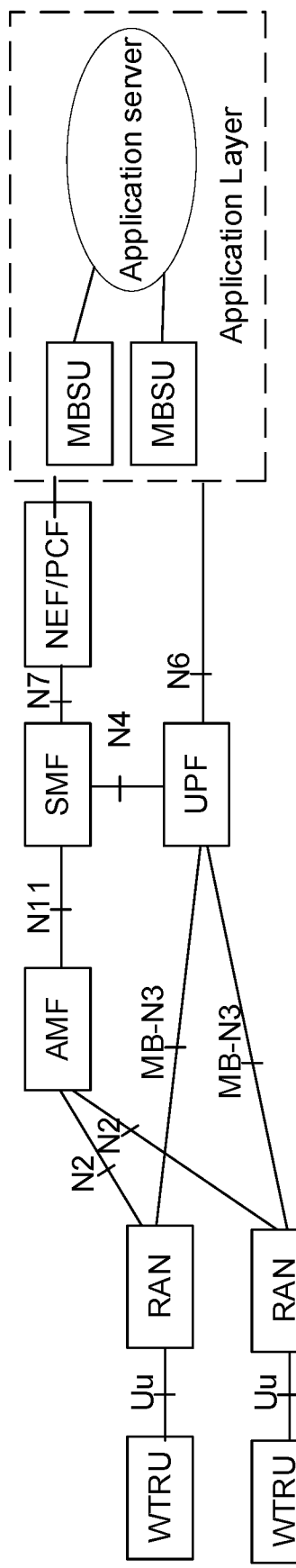
FIG. 2 illustrates an example of an MBS architecture.

A multicast-broadcast service (MBS) may be provided by a wireless communication network described herein. The MBS may include a point-to-multipoint service in which data may be transmitted from a (e.g., single) source entity such as a network node to multiple recipients such as WTRUs. Transmitting the same data to multiple recipients may allow network resources to be shared. FIG. 2 illustrates an example of an MBS architecture that may include one or more of a WTRU, a RAN, an AMF, an SMF, a UPF, a network exposure function (NEF) and/or a policy control function (PCF), an application layer (e.g., including a MBS user plane or MBSU configured to serve as a media anchor for MBS data traffic), one or more communication interfaces (e.g., N2, MB-N3, N4, N6, N7, N11, etc.), etc.

Figure 3:
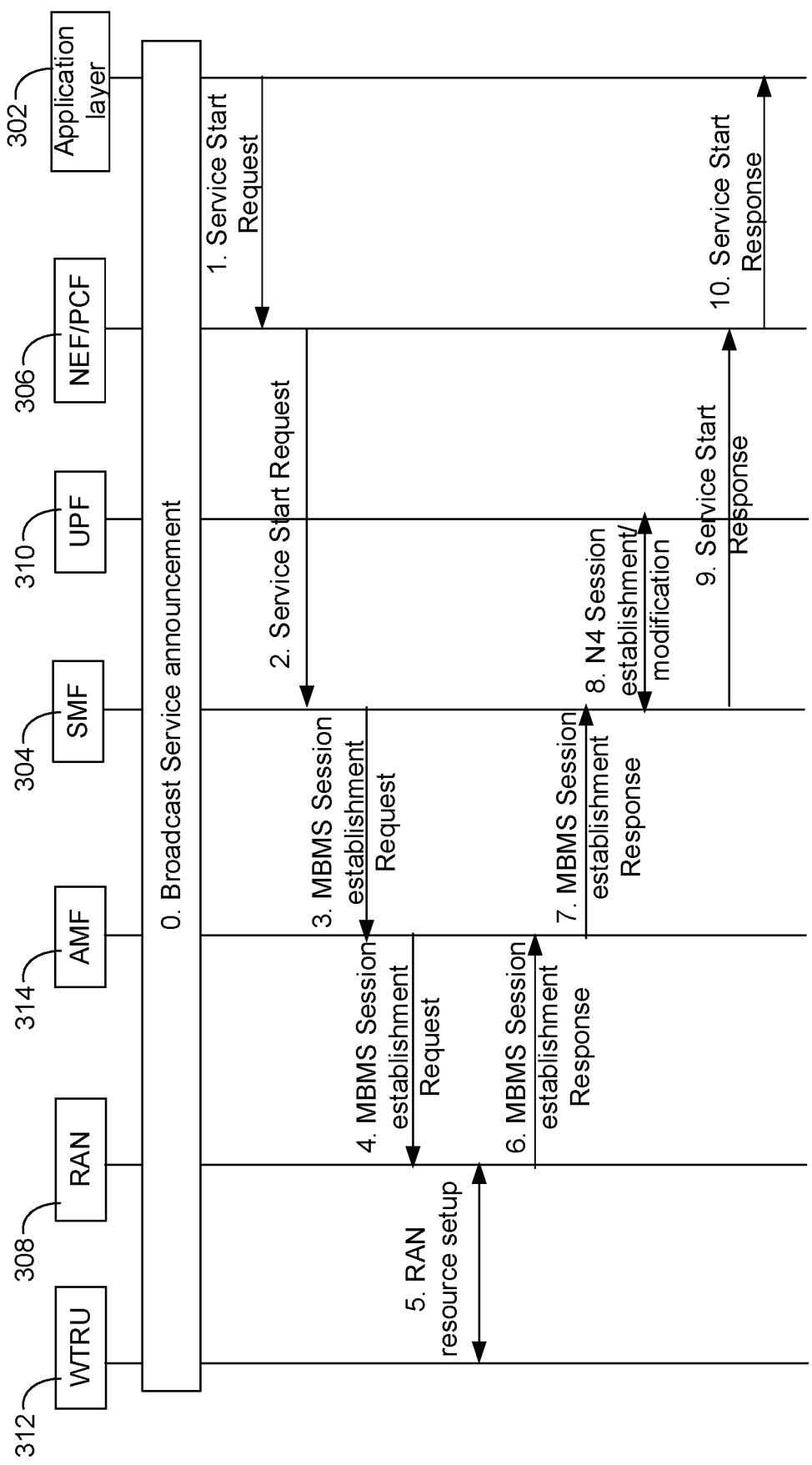
FIG. 3 illustrates an example of broadcast session establishment.

FIG. 3 illustrates an example of session establishment for a broadcast service. An application layer component 302 may provide broadcast information (e.g., a service area, a quality of service (QoS) requirement, etc.) to a session management function (SMF) 304, e.g., via a network exposure function (NEF) and/or a policy control function (PCF) 306. The SMF 304 may select a radio access network (RAN) 308, for example, based on the broadcast service area indicated in the broadcast information. The SMF 304 may establish a broadcast bearer (e.g., on a mobile broadband (MB)-N3 interface) between a user plane function (UPF) 310 and the selected RAN 308. The UPF 310 may forward broadcast packets the UPF may receive from the application layer component 302 to the RAN 308 in a broadcast session. The RAN 308 may use radio bearers to deliver the broadcast packets (e.g., received from the UPF 310) to a WTRU 312.

In examples, the application layer component 302 may, at 1, send a service start request (e.g., a service start notification) to the NEF/PCF 306, which may forward the service start request to the SMF 304 at 2. At 3, the SMF may send a session establishment request such as a multimedia broadcast multicast services (MBMS) session establishment request to an AMF 314. At 4, the AMF 314 may forward the session establishment request to the RAN 308, which may, in response, initiate RAN resource setup with the WTRU 312 at 5. At 6, the RAN 308 may send a session establishment response such as an MBMS session establishment response to the AMF 314 and the AMF 314 may forward the response to the SMF 304 at 7. At 8, the SMF 304 may start session (e.g., N4 session) establishment (e.g., if no MBS session exists for the WTRU 312) and/or modification (e.g., if a MBS session already exists for the WTRU 312 but needs to be modified) with the UPF 310. The SMF 304 may also send a service start response to the NEF/PCF 306 at 9 and the NEF/PCF 306 may forward that response to the application layer component 302 at 10.

Figure 4:
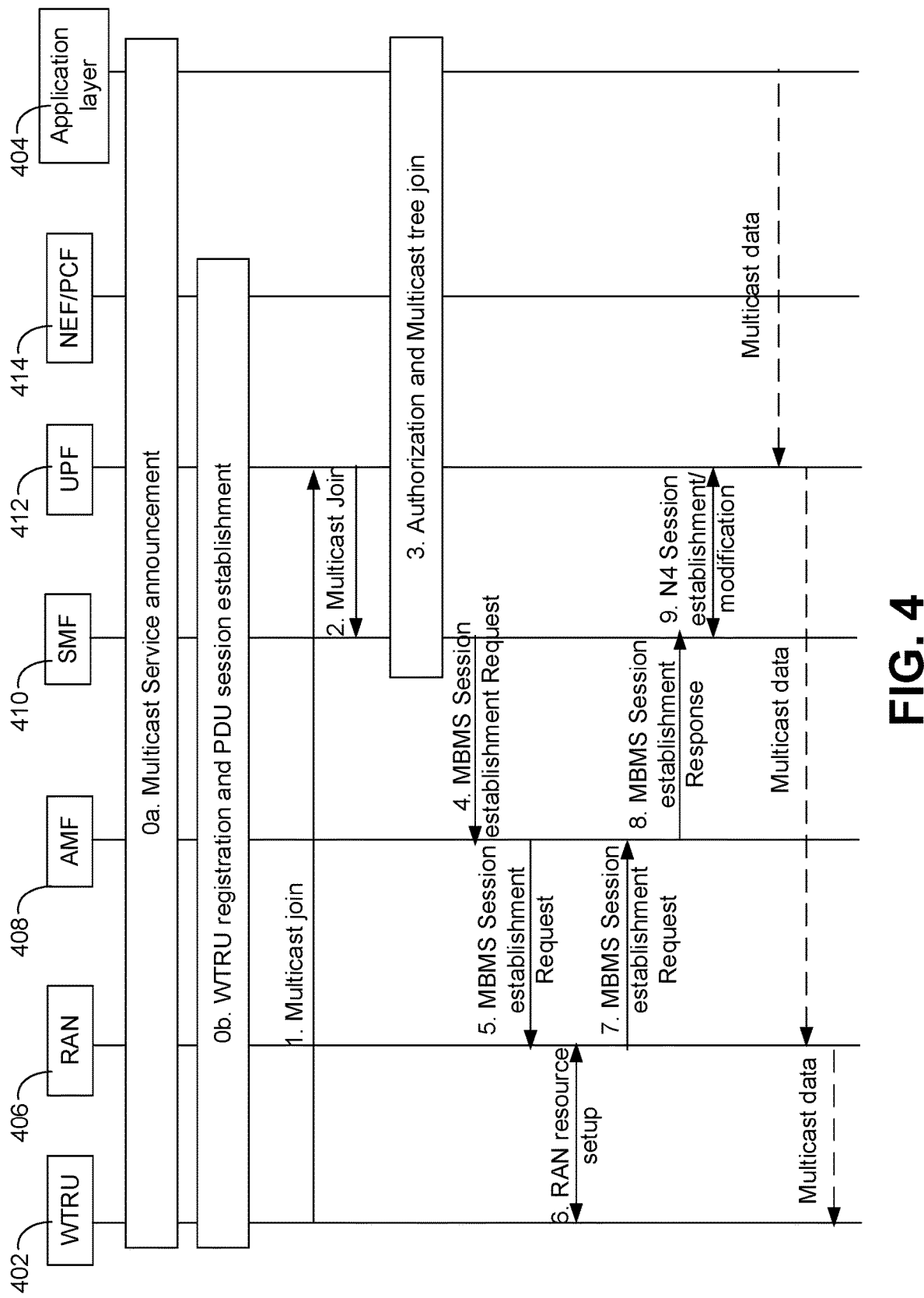
FIG. 4 illustrates an example of multicast session establishment.

FIG. 4 illustrates an example of session establishment for a multicast service. As shown, a WTRU 402 may, at 0a, receive a multicast service announcement from an application layer component 404 through one or more of an RAN 406, an AMF 408, an SMF 410, a UPF 412, and/or an NEF/PCF 414. The WTRU 402 may, at 0b, register with the network and/or establish a packet data unit (PDU) session with the network via one or more of the RAN 406, the AMF 408, the SMF 410, the UPF 412, and/or the NEF/PCF 414. To establish a session for a multicast service provided by the network, the WTRU 402 may, at 1, send a multicast join message to the SMF 410 and/or the UPF 412. The multicast join message may indicate the multicast group that the WTRU desires to join. The multicast group may be indicated in the join message, for example, by a multicast internet protocol (IP) address. At 2, the UPF 412 may notify the SMF 410 about the WTRU's request to join the multicast service, and the SMF 410 and/or UPF 412 may communicate with the NEF/PCF 414 and/or the application layer component 404 to determine whether the WTRU 402 may be authorized to join the multicast service and/or a multicast tree (e.g., one or more paths for multicast traffic) associated with the service. At 4, the SMF 404 may (e.g., after performing the aforementioned authorization procedure) establish or modify a multicast session between the UPF 406 and a RAN 406, for example, by sending a session establishment request (e.g., a MBMS session establishment request) to the AMF 408. At 5, the AMF 408 may send a session establishment request to the RAN 406, which may, in response, initiate resource setup to facilitate the session establishment at 6 and send a session establishment response to the AMF 408 at 7. At 8, the AMF 408 may send a session establishment response to the SMF 410 and the SMF 410 may start at 9, session (e.g., N4 session) establishment (e.g., if no such session exists for the WTRU 402) and/or session modification (e.g., if such a session already exists for the WTRU 402 but needs to be modified) with the UPF 412. Once the session is established or modified, the UPF 412 may begin forwarding multicast packets that may be received from the application layer component 404 to the RAN 406 in the established or modified multicast session, and the RAN 406 may use one or more radio bearers to deliver the multicast packets to the WTRU 402.

A relay, such as a WTRU-to-network (WTRU-to-NW) relay, may be used to provide a proximity service (ProSe), a vehicle-to-everything (V2X) service, and/or the like to one or more remote WTRUs. In examples, these remote WTRUs may be out of network (e.g., a 5G/NR network) coverage and, as such may not be able to directly communicate with the network (e.g., with a core network (CN)). In examples, the remote WTRUs may be under network (e.g., a 5G/NR network) coverage but may prefer (e.g., based on automated or manual selection) to use an alternative communication interface such as a PC5 interface to communicate with the network (e.g., instead of a Uu interface). In either scenario, the remote WTRUs may discover and select a WTRU-to-Network relay (e.g., which may itself be a WTRU) to facilitate the communication between the remote WTRUs and the network.

Figure 5:
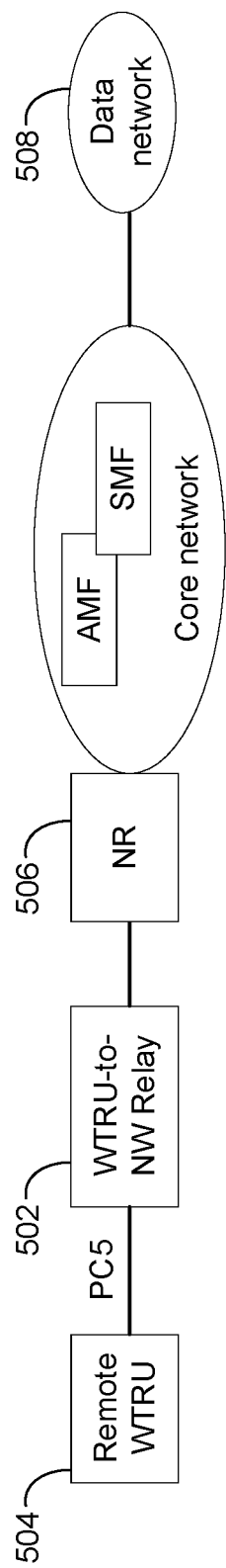
FIG. 5 illustrates an example use of a Layer 3 WTRU-to-network relay.

FIG. 5 illustrates an example of using a Layer 3 WTRU-to-network 502 relay to facilitate the communication between a remote WTRU 504 and a 5G/NR network 506. When referred to herein, a Layer 3 relay or Layer 3 WTRU-to-network relay may include a device (e.g., a WTRU) configured to provide relay services to a remote WTRU at one or more layers (e.g., such as an IP layer) that are above an application service (AS) layer. When referred to herein, a Layer 2 relay or Layer 2 WTRU-to-network relay may include a device (e.g., a WTRU) configured to provide relay services to a remote WTRU at an AS layer. As shown in the example of FIG. 5, the Layer 3 WTRU-to-Network relay 502 may be configured to communicate with the remote WTRU 504 via a PC5 interface, and may act as an IP router for the remote WTRU 504 (e.g., the relay 502 may provide pass IP packets between the remote WTRU 504 and a data network 508).

Figure 6:
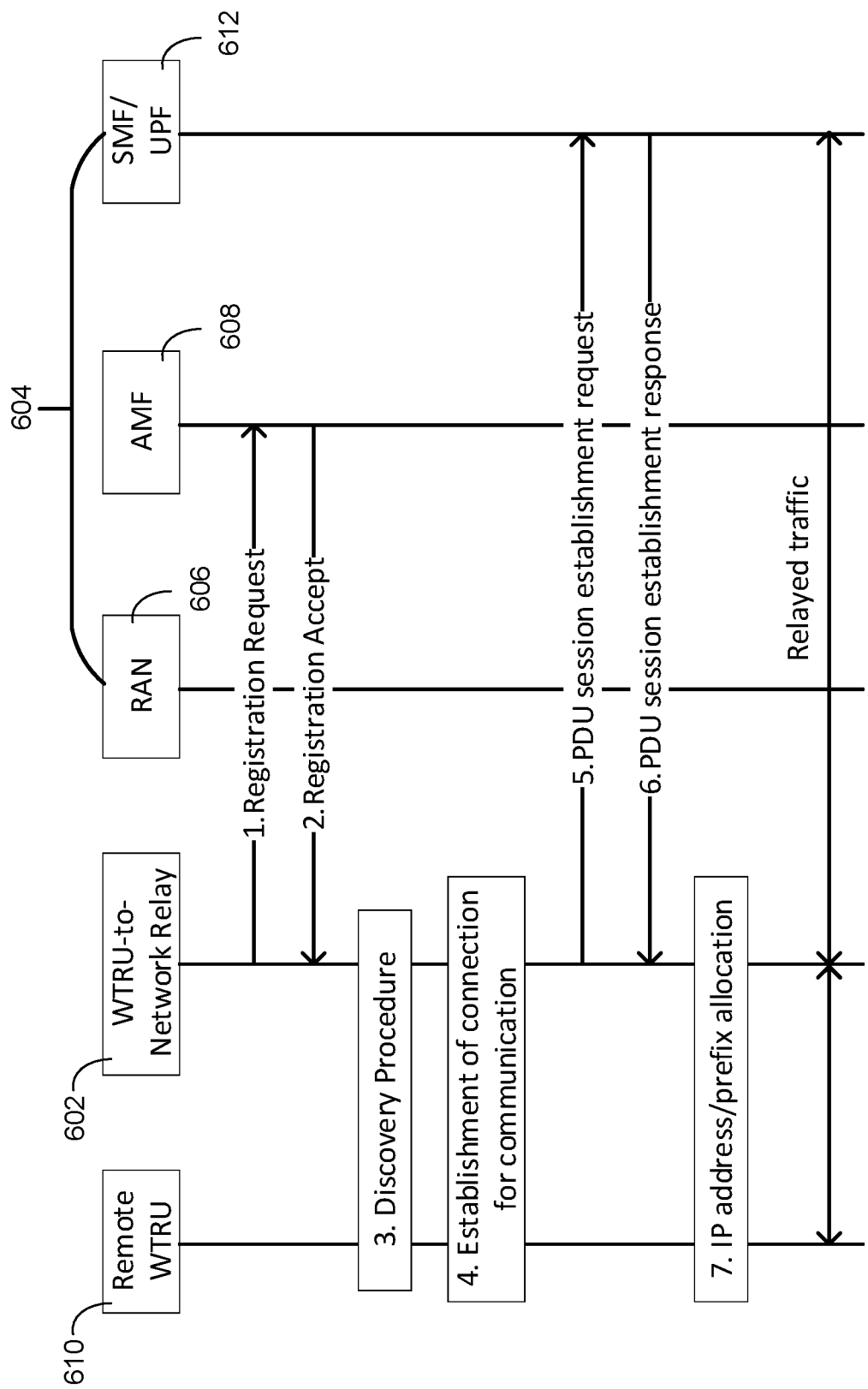
FIG. 6 illustrates one or more example network interactions that may involve a Layer 3 WTRU-to-network relay.

FIG. 6. illustrates example interactions (e.g., message flows) between different entities of a communication system that utilizes a Layer 3 WTRU-to-Network relay. As shown, a relay WTRU such as a Layer 3 WTRU-to-network relay 602 may register with a network 604 (e.g., a 5G/NR network), for example, by sending a registration request to the network (e.g., to a RAN 606 and/or an AMF 608 of the network) at 1 and receiving a registration response from the network (e.g., from the AMF 606) at 2. A remote WTRU 610 may establish a PC5 session with the Layer 3 WTRU-to-network relay 602, for example, by performing a discovery procedure (e.g., to discover the relay 602) at 3 and establishing a connection (e.g., a PC5 connection) with the relay 602 at 4. The WTRU-to-Network relay 602 may establish a packet data unit (PDU) session (e.g., or a packet data network (PDN) connection in an evolved packet core (EPC)) with the network 604 (e.g., on behalf of the remote WTRU 610). For example, the WTRU-to-Network relay 602 may send a PDU session establishment request to an SMF/UPF 612 of the network 604 and receive a PDU session establishment response from the SMF/UPF 612. An IP address and/or prefix may be allocated to the remote WTRU 610 by the network 604 at 7, and traffic between the remote WTRU 610 and the network 604 may subsequently be relayed by the WTRU-to-Network relay 602.

Figure 7:
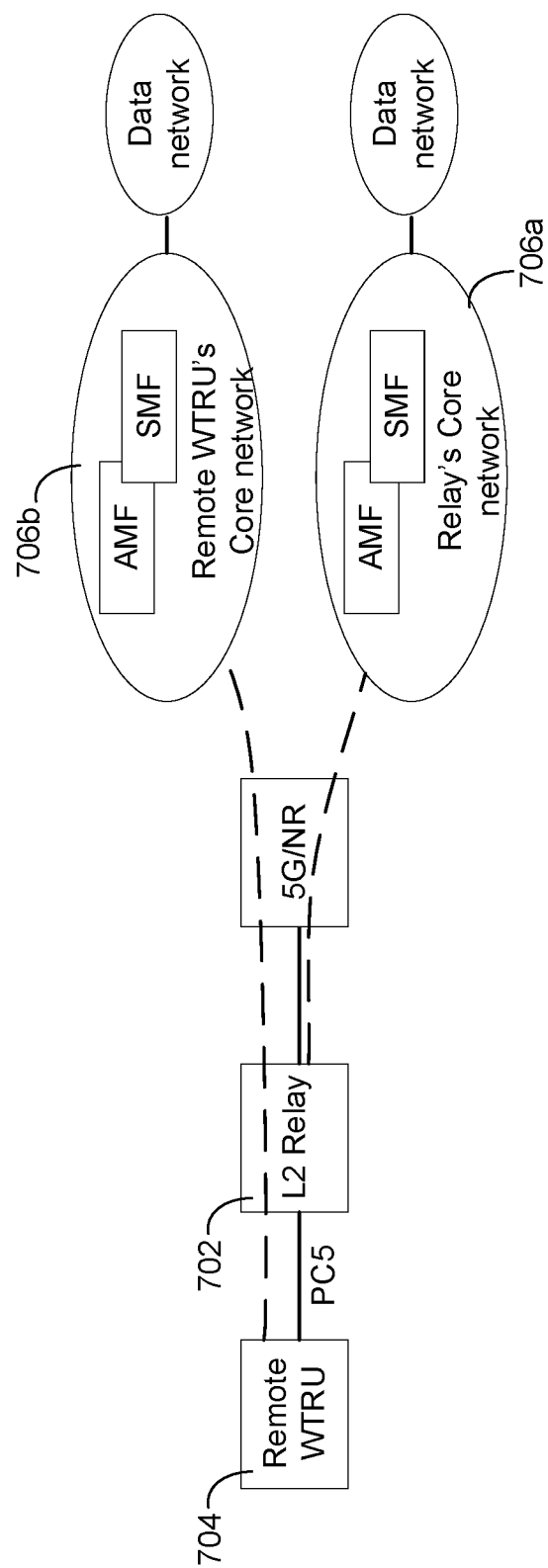
FIG. 7 illustrates an example use of a Layer 2 WTRU-to-network relay.

FIG. 7 illustrates an example of a Layer 2 WTRU-to-Network relay 702 (e.g., which may itself be a WTRU) that may be configured to operate as a radio signaling relay between a remote WTRU 704 and a first network 706a (e.g., a 5G/NR network) with which the relay 702 may be registered. The remote WTRU 704 may also access a second network 706b (e.g., a 5G/NR network) with which the remote WTRU 704 may be registered and may establish a PDU session with the second network 706b. The dotted lines in the figure may indicate that communication between the remote WTRU 704 and one or more or the networks 706a, 706b may be made transparent to the remote WTRU 704 (e.g., the remote WTRU 704 may not be informed about the interaction between the relay WTRU 702 and the network (s)).

A remote WTRU may request authorization to join a multicast-broadcast service. A network may control multicast-broadcast session establishment and/or traffic including, for example, determining whether to grant authorization to a remote WTRU to join the multicast-broadcast service and/or receive (e.g., specific) multicast-broadcast data. For example, a remote WTRU may request to join a multicast group and a network (e.g., a core network function) may determine, in response to receiving the join request, whether the WTRU is allowed to join the multicast group. The decision to allow or deny the join request may be made, for example, based on subscription information associated with the remote WTRU (e.g., as shown in FIG. 4). This request and/or grant process may be facilitated by a relay WTRU such as a Layer 3 network relay described herein. For example, as shown in FIG. 5, a remote WTRU may access a network via a Layer 3 network relay. The network may have visibility of (e.g., only) the Layer 3 network relay and not the remote WTRU. As such, the network may not be able to identify the remote WTRU that desires to join a multicast-broadcast service provided by the network, nor the specific multicast-broadcast data/traffic that the remote WTRU desires to access. In these (and other) situations, the network and/or the remote WTRU may rely on the Layer 3 network relay to provide and/or receive a multicast-broadcast service.

A network that provides multicast-broadcast services may prevent mis-use of the services (e.g., by a remote WTRU) by implementing an authorization process. The network may, for example, be configured to request a remote WTRU to obtain authorization before allowing the remote WTRU to access an MBS. Further, one or more (e.g., not all) network relays (e.g., Layer 3 or Layer 2 network relays) may be configured or authorized to provide MBS relay services. For example, a network may allow or disallow a relay to provide MBS relay services based on the performance, power consumption, network condition, location, etc. of the relay. A remote WTRU may configured to detect the MBS relay capabilities of a network relay before requesting an MBS service through the relay. In another aspect, a network relay such as a Layer 2 network relay may be configured to monitor paging messages (e.g., from a RAN) on behalf of a remote WTRU. The relay may do so, for example, by determining (e.g., calculating) the correct paging occasions based on the remote WTRU's ID, system frame number, and/or other scheduling/timing parameters provided by the network. For multicast-broadcast services, paging may be performed by the network (e.g., core network) through one or more group paging messages. These group paging messages may include a temporary mobile group identity (TMGI) that may not be related to an (e.g., any) ID of the remote WTRU. One or more techniques described herein may be used to enable a network relay (e.g., a Layer 2 network relay) to monitor group paging (e.g., from a RAN) on behalf of a remote WTRU (e.g., even if the group paging is not related to or specific to the remote WTRU) so that the remote WTRU (e.g., in an idle state) may not miss MBS related notifications or traffic.

A network relay (e.g., a first WTRU) may be configured to request MBS authorization for a remote WTRU (e.g., a second WTRU). In some examples, the network relay may receive an MBS (e.g., multicast) group join request from the remote WTRU. The network relay may construct an authorization request message based on information possessed by the network relay (e.g., information regarding the remote WTRU and/or the MBS group), and may send the constructed authorization request message to the network (e.g., a core network (CN) component or function) that provides the MBS service. In examples, the authorization request message sent by the network relay may include an identifier of the remote WTRU (e.g., a remote WTRU ID) and/or information associated with the MBS group such as a multicast IP address, a TMGI, etc. associated with the MBS group. The network relay may receive an authorization response from the network (e.g., from a core network component or function) that may indicate whether the authorization request has been granted or denied. The network relay may inform the remoted WTRU about the response, and, if the request has been granted, the network relay may start relaying multicast traffic (e.g., data and/or control information) to the remote WTRU.

In examples, the request to join an MBS (e.g., multicast) group may be sent from the remote WTRU to the network relay via an internet group management protocol (IGMP) message or through PC5 signaling (e.g., which may include information about the multicast group). In examples, the MBS join request sent from the remote WTRU to the network relay may be included in a report message (e.g., a report message that informs the network about the remote WTRU). In examples, the network relay may send the multicast authorization request to a session management function (SMF) or an access and mobility management function (AMF) of the network.

In examples, the network relay (e.g., a WTRU-to-network relay) may receive the multicast group join request from the remote WTRU via a PC5 connection. The join request may include multicast group information such as an ID of the multicast group. The network relay may retrieve information regarding the remote WTRU such as an identifier (ID) of the remote WTRU ID, for example, from context stored by the relay in association with the PC5 connection. The network relay may construct and/or send a multicast authorization request (e.g., on behalf of the remote WTRU) to the network (e.g., to a core network component or function). The authorization request may include, for example, information that identifies the remote WTRU (e.g., an ID of the remote WTRU) and information regarding the multicast group to be joined. The network relay may receive and/or store an authorization response (e.g., authorization results) from the network that may indicate whether the authorization has been granted or denied. If the authorization request is denied, the network relay may, in examples, not initiate another authorization request for the same MBS group or service when the network relay receives another join request from the remote WTRU for the group or service. If the authorization request is granted, the network relay may determine whether it has already joined the multicast group (e.g., the relay may have an existing MBS connection to the group for the relay itself or for another remote WTRU). If the network relay has not already joined the multicast group, the network relay may join the multicast group. If the network relay has already joined the multicast group, the network relay may not need to join the multicast group again (e.g., the network relay may utilize an existing MBS connection to serve the remote WTRU).

In examples, the network relay may indicate its own ID (e.g., WTRU ID together with the remote WTRU ID in the multicast authorization request. The network may consider such an authorization request with multiple WTRU IDs as a combined request (e.g., for both the remote WTRU and the network relay). In examples, the network relay may trigger a PC5 QoS flow establishment and/or modification based on QoS information of the multicast group traffic, for example, after the authorization request has been granted and/or the network relay starts to receive multicast traffic from the network. When the network relay receives multicast traffic (e.g., multicast data and/or control information) associated with a multicast group, the network relay may check which one or more remote WTRUs (e.g., the relay may be providing services to multiple remote WTRUs) have been authorized for the multicast group and forward the received multicast traffic to the one or more remote WTRUs (e.g., via respective PC5 connections or interfaces established with the remote WTRUs). The network relay may (e.g., periodically and/or based on a request from the network) report multicast group information (e.g., list of remote WTRU IDs that are in a multicast group) to the network.

Figure 8:
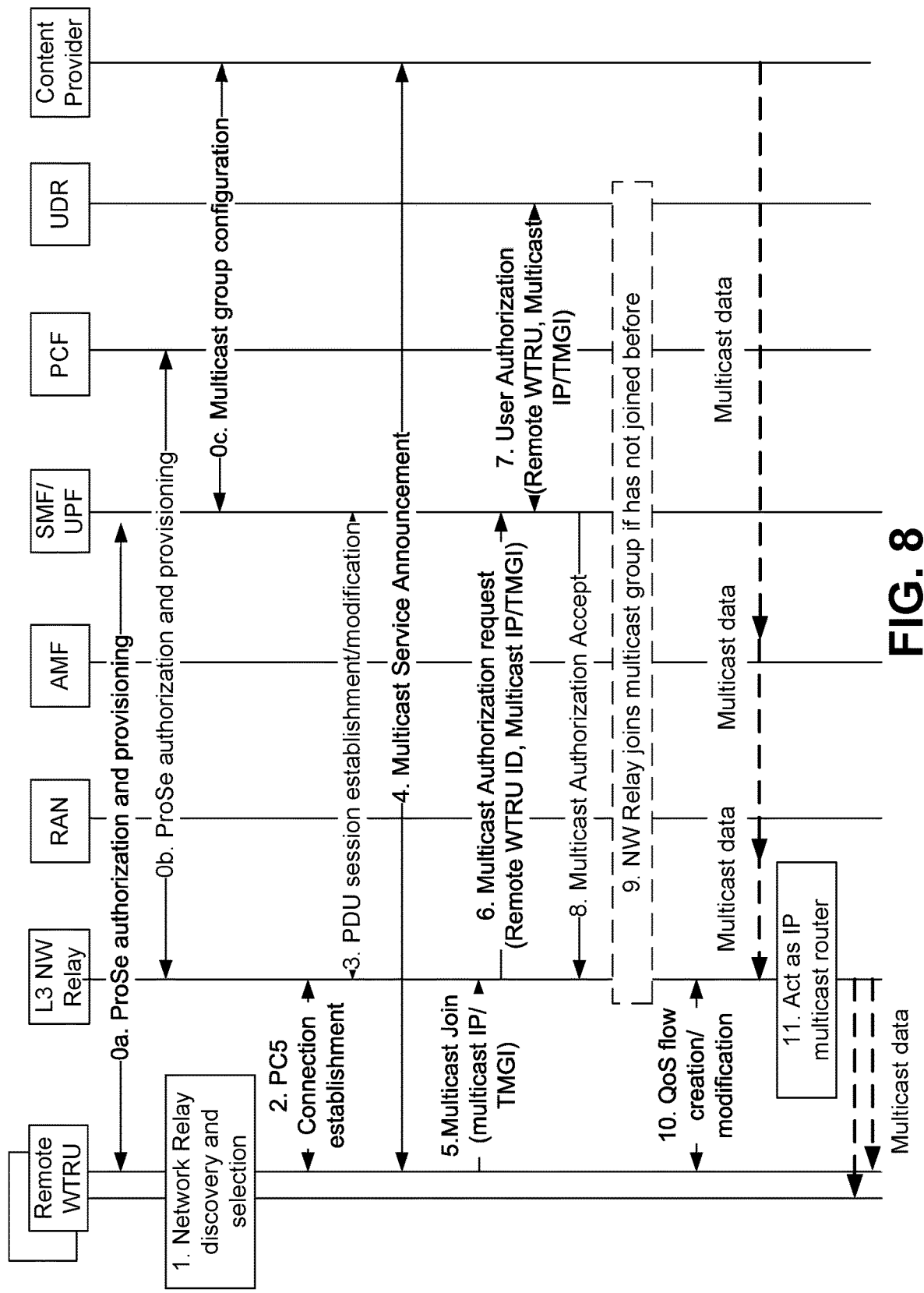
FIG. 8 illustrates an example of MBS authorization for a remote WTRU.

FIG. 8 illustrates an example of MBS (e.g., multicast) authorization for a remote WTRU. The interactions, message flows, and/or operations shown in the figure are for illustration purposes and a skilled person in the art will appreciate that other types of interactions, message flows, and/or operations (e.g., with different, more or fewer interaction participants, interactions, and/or operations) may also be used to accomplish the objectives described herein. There is no requirement to have all of the interaction participants, interactions, and/or operations illustrated in FIG. 8. No order of operations and/or interactions is required unless expressly indicated or inherently required.

As shown in FIG. 8, an authorization and/or provisioning procedure associated with a ProSe and/or V2X service may be performed at 0a and 0b by a network relay (e.g., a first WTRU), a remote WTRU (e.g., a second WTRU), and/or a network entity (e.g., a PCF). At 0c, a multicast content provider may complete (e.g., perform and/or implement) a multicast group configuration with the network. At 1, the remote WTRU may discover and select the network relay. At 2, the remote WTRU may establish a PC5 connection (e.g., PC5 unicast connection) with the network relay. At 3, the network relay may establish a PDU session or modify an existing PDU session for the remote WTRU (e.g., with a SMF/UPF). At 4, the remote WTRU may obtain MBS information, for example, based on a multicast service announcement made by the content provider or the network. At 5, the remote WTRU may request to join a multicast group, for example, by providing multicast group information (e.g., a multicast IP address and/or TMGI of the desired multicast group) to the network relay. The remote WTRU may send the multicast group information in a new PC5 signaling (PC5-S) message, in an existing PC5-S message (e.g., such as a link modification request), or in a user plane message (e.g., an IGMP message). At 6, the network relay may determine an ID of the remote WTRU (e.g., by retrieving the ID from stored PC5 connection context) and/or information regarding the multicast group (e.g., multicast IP, TMGI, etc.). The network relay may construct a remote WTRU multicast authorization request that may include the ID of the remote WTRU, a multicast IP address or TMGI associated with the desired multicast group, etc., and send the constructed authorization request to the network (e.g., to an SMF). The network relay may indicate (e.g., in the authorization request) that the remote WTRU is going to receive multicast traffic via the network relay. The network relay may include its own ID (e.g., WTRU ID) in the request.

At 7, the SMF may interact with a unified data repository (UDR) to determine whether the remote WTRU is allowed to join the multicast group, for example, based on information provided via the authorization request (e.g., WTRU ID, multicast IP address, TMGI, etc.). At 8, the SMF may send an authorization result (e.g., an indication of accept/reject) to the network relay. For example, a negative outcome (e.g., authorization denied) may be indicated in a multicast authorization reject message, and the network relay may inform the remote WTRU of the negative outcome. The remote WTRU may, in response to receiving the negative outcome, choose (e.g., select) another network relay (e.g., if available), to join the multicast group. If the authorization has been granted by the network, the network relay may inform the remote WTRU about the grant and may join the multicast group at 9, for example, if the network relay has not already joined the multicast group (e.g., for the relay itself or another WTRU). The network relay may (e.g., at 9 or at 6) inform the remote WTRU (e.g., via a PC5 message) that the requested multicast group or service may not be available if the network relay fails to join the multicast group.

The network relay may not execute a multicast group join request for the remote WTRU again if the network relay fails to obtain authorization to join the multicast group (e.g., at 6 and/or 8), or if the network relay fails to join the multicast group (e.g., at 9). The remote WTRU may send a message (e.g., to the network relay) to leave the multicast group that the remote WTRU has joined. The network relay may leave the multicast group if the relay receives a message from the remote WTRU to leave the multicast group and if no other remote WTRU connected to the network relay is participating in the multicast group. At 10, the network relay may establish or modify a PC5 QoS flow based on the multicast group traffic (e.g., based on QoS requirements of the multicast group traffic). For example, after the network relay joins the MBS group, the network relay may obtain one or more QoS requirements (e.g., parameters) associated with the MBS traffic (e.g., from an MBS announcement message, based on MBS configuration information, etc.). The network relay may perform a mapping between the one or more QoS requirements associated with the MBS traffic and one or more QoS requirements (e.g., parameters) associated with the PC5 interface. The network relay may then establish or modify an PC5 QoS flow for the MBS traffic (e.g., based on the mapping between the PC5 QoS parameters and the MBS QoS parameters). At 11, the network relay may (e.g., acting as an IP multicast router) forward traffic associated with the multicast group to the remote WTRU (and/or other remoted WTRUs) that have joined the same multicast group (e.g., via an PC5 interface with the relay). The network relay may forward the multicast traffic to each of the remote WTRUs (e.g., separately) as unicast data.

A network (e.g., a core network) may provide an MBS availability announcement. The network may (e.g., during ProSe authorization and provisioning) indicate to a network relay that MBS relay is allowed by the network relay. The network may provide the indication to the network relay, for example, if the network allows the network relay to relay MBS traffic from the network to a remote WTRU. The network may provide the indication to a remote WTRU, for example, if the network allows the remote WTRU to receive MBS traffic via a network relay. The network relay may broadcast an MBS relay supported indication in an announcement message (e.g., to the remote WTRU(s) connected to the network relay). A remote WTRU may perform network relay selection, for example, based on an MBS relay supported indication provided by the network relay in an announcement message.

In examples, a network may provide an MBS relay allowed indication to a network relay together with multicast group information (e.g., multicast IP address(es), TMGI(s), etc.) to indicate which multicast group traffic can be relayed. In examples, an MBS relay allowed indication may be provided from a PCF to a network relay. In examples, a network relay may determine whether an allowed multicast group is available in a current location (e.g., based on location indicated by a cell ID, a tracking area identity (TAI), etc.). In examples, a network relay may broadcast (e.g., in a ProSe announcement message) an MBS relay supported indication together with multicast group information to indicate which multicast group(s) is (are) allowed and available (e.g., the relay may include only those groups that the relay has successfully joined). In examples, a network may broadcast (e.g., using a predefined system information block (SIB)) an indication of whether an MBS relay is allowed/not allowed.

A remote WTRU may receive an MBS relay allowed indication from a network (e.g., a PCF) including multicast group information. The remote WTRU may monitor an announcement message (e.g., a ProSe announcement message) from a network relay. The remote WTRU may select the network relay based on an MBS relay supported indication announced by the network relay.

Figure 9:
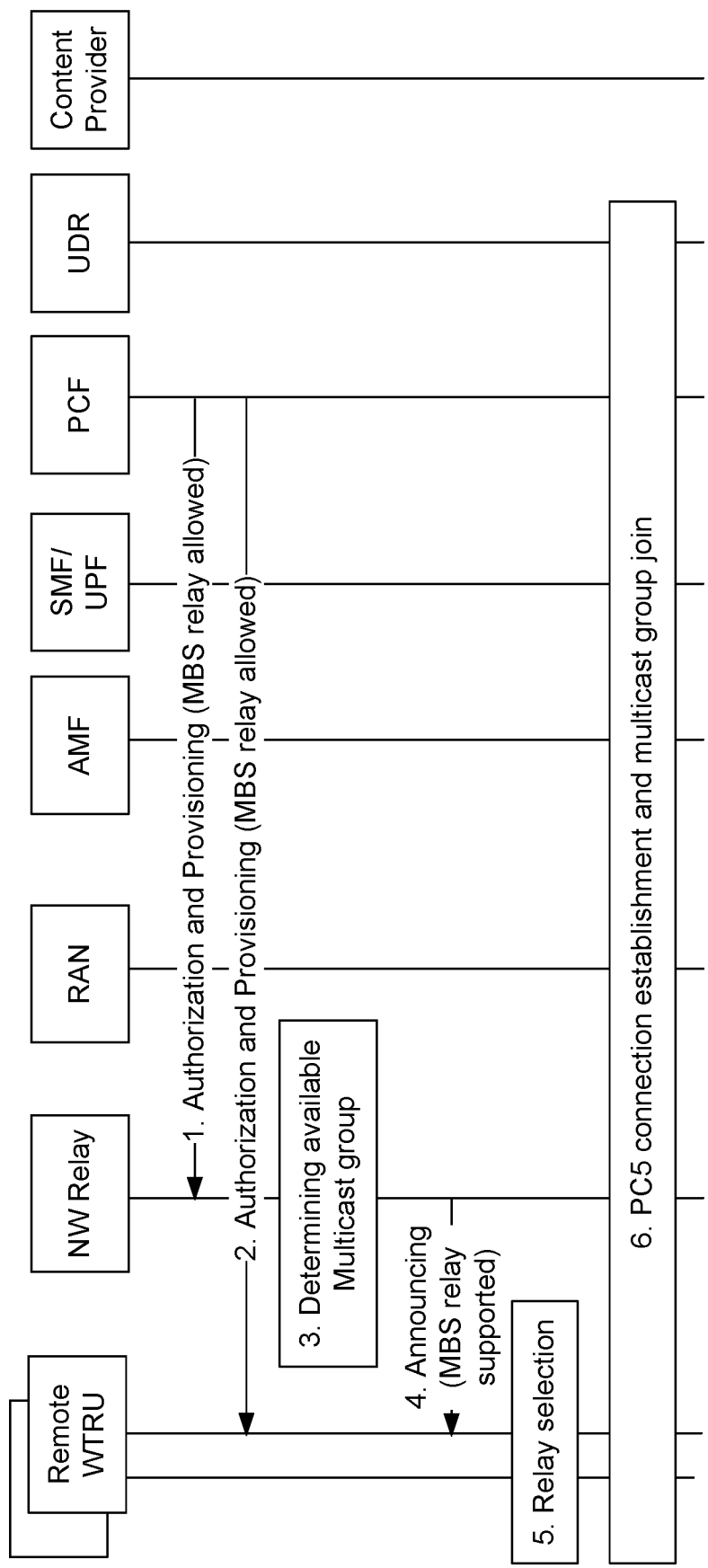
FIG. 9 illustrates an example of making an MBS availability announcement.

FIG. 9 illustrates an example of an MBS availability announcement. The interactions, message flows, and/or operations shown in the figures are for illustration purposes and a skilled person in the art will appreciate that other types of interactions, message flows, and/or operations (e.g., with different, more or fewer interaction participants, interactions and/or operations) may also be used to accomplish the objectives described herein. There is no requirement to use all of the interaction participants, interactions, and/or operations illustrated in FIG. 9. No order of operations and/or interactions is required unless expressly indicated or inherently required.

As shown, a network relay (NW relay) may receive, at 1, an MBS relay allowed indication from a network (e.g., from a PCF) that may include information regarding one or more allowed multicast groups. At 2, a remote WTRU may receive an MBS relay allowed indication from the network (e.g., the PCF) that may include information regarding one or more allowed multicast groups. At 3, the network relay may determine available multicast group(s), e.g., in the current location of the relay. At 4, the network relay may broadcast an MBS relay supported indication (e.g., in a ProSe announcement message) that may include information regarding the available and/or allowed multicast group(s). At 5, the remote WTRU may select the network relay, for example, based on respective MBS relay supported indications provided by one or more network relays (e.g., which may include based on the available and allowed multicast group(s) information). At 6, the remote WTRU may establish a PC5 connection and may join an available multicast group.

A remote WTRU may send a multicast group paging monitor request to a network relay, for example, if the remote WTRU has joined a multicast group (e.g., via the network relay) and/or if the remote WTRU has entered an idle mode. The request may include, for example, information regarding the multicast group to be monitored such as a TMGI or a multicast IP address of the multicast group. The network relay may start to monitor multicast group paging messages after receiving the group paging monitor request from the remote WTRU. The network relay may forward a group paging message to the remote WTRU if there is a group paging message for the multicast group requested by the remote WTRU. The network relay may (e.g., if the network relay is in an IDLE mode when it receives the group paging for the multicast group) return to a connected mode before forwarding a group paging message to the remote WTRU.

A network relay may be configured to forward a group paging message to multiple remote WTRUs if more than one remote WTRU request to monitor group paging for the multicast group. A remoted WTRU may send a group paging monitor request before or after the remote WTRU enters an idle state. A group paging monitor request sent by a remote WTRU may include information about more than one multicast group that the remote WTRU desires to monitor.

A network relay may monitor a group paging message even if the network relay is in a connected state. The network relay may be configured with one or more monitoring gaps while in a connected state so as to allow the network relay to monitor group paging messages in a connected state. These gaps may be determined (e.g., calculated), for example, based on information associated with the group paging (e.g., based on a TMGI). Usage of the monitoring gaps may be negotiated, for example, between the network relay and a network (e.g., a RAN) so that both entities may be synchronized in that regard. A network relay may stop monitoring group paging for a multicast group based on one or more of the following: a request by a remote WTRU (e.g., via PC5 signaling); a determination that a remote WTRU has entered a connected mode; if the PC5 connection with a remote WTRU is lost or released; etc.

Figure 10:
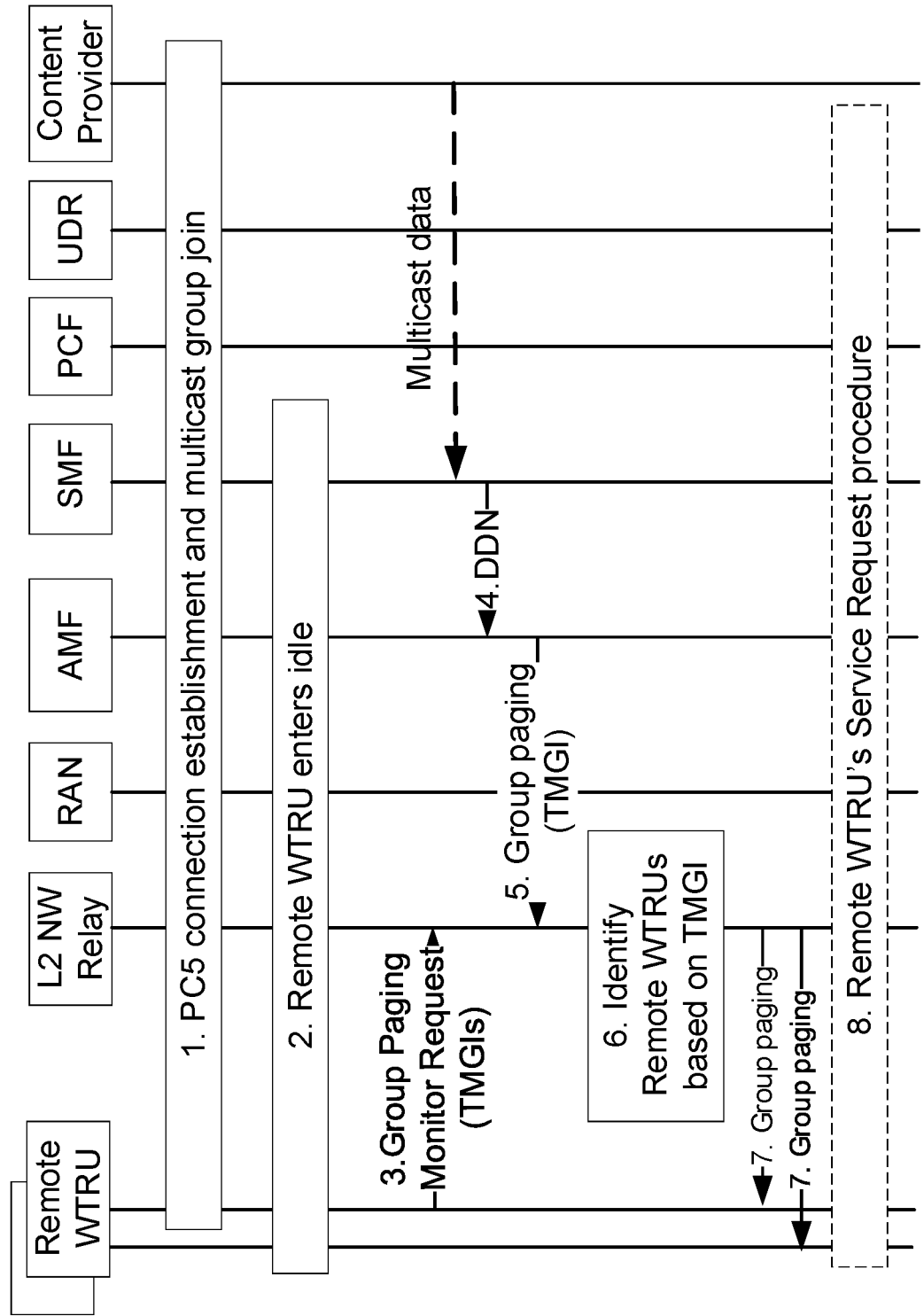
FIG. 10 illustrates an example of monitoring group paging messages.

FIG. 10 illustrates an example of monitoring group paging message. The interactions, message flows, and/or operations shown in the figure are for illustration purposes and a skilled person in the art will appreciate that other interactions, message flows, or operations (e.g., with different, more or fewer interaction participants, interactions, and/or operations) may be used to accomplish the objectives described herein. There is no requirement that all of the interactions, message flows, and operations illustrated in FIG. 10 are to be performed and no order of operations and/or interactions is required unless expressly indicated or inherently required.

As shown in FIG. 10, a remote WTRU may, at 1, establish a PC5 connection with a network relay (e.g., a Layer 2 network (NW) relay), and may join a multicast group via the network relay. At 2, the remote WTRU may enter an idle state. At 3, the remote WTRU may send a group paging monitor request to the network relay. The request may include information about one or more multicast groups (e.g., TMGI(s) that the remote WTRU desires to monitor. At 4, the traffic of a multicast group may trigger a downlink data notification (DDN) message (e.g., from an SMF to an AMF). At 5, an AMF may perform group paging, for example, by including the multicast group information in a group paging message. At 6, the network relay may (e.g., while monitoring group paging messages) receive the group paging message and identify the remote WTRU(s) that have requested the network relay to monitor paging messages associated with the multicast group(s). The network relay may identify these remote WTRU(s), for example, by matching the TMGI contained in the paging message with the TMGI included in the group paging monitor request(s) sent by the remote WTRU(s). At 7, the network relay may forward the group paging message to the identified remote WTRU(s). At 8, the remote WTRU (e.g., each identified remote WTRU) may trigger a service request procedure to enter a connected state.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A first wireless transmit/receive unit (WTRU), the first WTRU comprising:
a processor, wherein the processor is configured to:
receive a provisioning message from a network node, wherein the provisioning message indicates provisioning information for a multicast broadcast service (MBS) and indicates that multicast data associated with the MBS is allowed to be relayed;
determine that the MBS is available for a location based on the provisioning information, wherein the first WTRU is associated with the location;
send a broadcast message to a second WTRU based on a determination that the MBS is available for the location, wherein the broadcast message indicates a multicast group;
receive a multicast request message from the second WTRU, wherein the multicast request message indicates that the second WTRU is requesting to join the multicast group;
determine an identifier for the second WTRU using a connection context associated with the multicast request message; and
send an authorization request to the network node, wherein the authorization request indicates that the second WTRU is requesting to join the multicast group and indicates the determined identifier for the second WTRU.

2. The first WTRU of claim 1, wherein the provisioning information indicates one or more multicast groups, and wherein the processor is configured to determine that the MBS is available for the location based on the provisioning information by:
determining the location; and
determining that the multicast group is available for the location, wherein the multicast group is from the one or more multicast groups.

3. The first WTRU of claim 1, wherein the provisioning information further indicates one or more multicast groups associated with the location, and wherein the multicast group is from the one or more multicast groups.

4. The first WTRU of claim 1, wherein the multicast group is a first multicast group, wherein the broadcast message further indicates a second multicast group, and wherein the processor is further configured to determine that the first multicast group and the second multicast group are available for the location.

5. The first WTRU of claim 1, wherein the processor is further configured to receive an authorization response from the network node, wherein the authorization response indicates that the second WTRU is authorized to join the multicast group.

6. The first WTRU of claim 5, wherein the processor is further configured to:
receive multicast data from the network node; and
forward the multicast data to the second WTRU when the second WTRU is authorized to join the multicast group.

7. The first WTRU of claim 5, wherein the processor is further configured to send a multicast message to the second WTRU when the authorization response indicates that second WTRU is authorized to join the multicast group.

8. The first WTRU of claim 1 wherein the connection context is further associated with a PC5 connection between the first WTRU and the second WTRU, and wherein the processor is further configured to determine a quality of service (QoS) to be provided by the PC5 connection for relaying the multicast data.

9. The first WTRU of claim 7, wherein the multicast message further indicates a quality of service (QoS) to be provided by a PC5 connection for relaying the multicast data.

10. The first WTRU of claim 8, wherein the processor is further configured to create or modify QoS flows for the PC5 connection based on the determined QoS.

11. A method performed by a first wireless transmit/receive unit (WTRU), the method comprising:
receiving a provisioning message from a network node, wherein the provisioning message indicates provisioning information for a multicast broadcast service (MBS) and indicates that multicast data associated with the MBS is allowed to be relayed;

determining that the MBS is available for a location based on the provisioning information, wherein the first WTRU is associated with the location;

sending a broadcast message to a second WTRU based on the determination that the MBS is available for the location, wherein the broadcast message indicates a multicast group;

receiving a multicast request message from the second WTRU, wherein the multicast request message indicates that the second WTRU is requesting to join the multicast group;

determining an identifier for the second WTRU using a connection context associated with the multicast request message; and sending an authorization request to the network node, wherein the authorization request indicates that the second WTRU is requesting to join the multicast group and indicates the determined identifier for the second WTRU.

12. The method of claim 11, wherein the provisioning information indicates one or more multicast groups, and wherein determining that the MBS is available for the location based on the provisioning information comprises:
determining the location; and
determining that the multicast group is available for the location, wherein the multicast group is from the one or more multicast groups.

13. The method of claim 11, wherein the provisioning information further indicates one or more multicast groups associated with the location, and wherein the multicast group is from the one or more multicast groups.

14. The method of claim 11, wherein the multicast group is a first multicast group, wherein the broadcast message further indicates a second multicast group, and wherein the method further comprises determining that the first multicast group and the second multicast group are available for the location.

15. The method of claim 11, wherein the method further comprises receiving an authorization response from the network node, wherein the authorization response indicates that the second WTRU is authorized to join the multicast group and that the first WTRU is authorized to relay multicast group traffic.

16. The method of claim 15, wherein the method further comprises:
receiving multicast data from the network node; and
forwarding the multicast data to the second WTRU when the second WTRU is authorized to join the multicast group.

17. The method of claim 15, wherein the method further comprises sending a multicast message to the second WTRU when the authorization response indicates that the second WTRU is authorized to join the multicast group.

18. The method of claim 11, wherein the connection context is further associated with a PC5 connection between the first WTRU and the second WTRU, and wherein the method further comprises determining a quality of service (QoS) to be provided by the PC5 connection for relaying the multicast data.

19. The method of claim 17, wherein the multicast message further indicates a quality of service (QoS) to be provided by a PC5 connection for relaying the multicast data.

20. The method of claim 18, wherein the method further comprises creating or modifying QoS flows for the PC5 connection based on the determined QoS.

* * * * *